US010288432B1

(12) United States Patent
Sokolov et al.

(10) Patent No.: US 10,288,432 B1
(45) Date of Patent: May 14, 2019

(54) SYSTEMS AND METHODS FOR GUIDING USERS TO NETWORK-ENABLED DEVICES

(71) Applicant: Symantec Corporation, Mountain View, CA (US)

(72) Inventors: Ilya Sokolov, Boston, MA (US); Keith Newstadt, Newton, MA (US); Richard F. Andrews, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 40 days.

(21) Appl. No.: 15/623,823

(22) Filed: Jun. 15, 2017

(51) Int. Cl.
*G01C 21/20* (2006.01)
*H04W 24/08* (2009.01)
*H04W 64/00* (2009.01)

(52) U.S. Cl.
CPC .......... *G01C 21/206* (2013.01); *H04W 24/08* (2013.01); *H04W 64/00* (2013.01)

(58) Field of Classification Search
CPC ..... G01C 21/206; H04W 64/00; H04W 24/08
See application file for complete search history.

(56) References Cited

U.S. PATENT DOCUMENTS

| | | | | |
|---|---|---|---|---|
| 9,958,277 B1* | 5/2018 | Espy | | G01C 21/206 |
| 9,979,756 B2* | 5/2018 | Nomani | | H04L 65/1073 |
| 2009/0243932 A1* | 10/2009 | Moshfeghi | | G01S 5/14 |
| | | | | 342/378 |
| 2011/0130949 A1* | 6/2011 | Arrasvuori | | G01C 21/3638 |
| | | | | 701/532 |
| 2012/0072110 A1* | 3/2012 | Venkatraman | | G01C 5/06 |
| | | | | 701/434 |
| 2015/0023183 A1* | 1/2015 | Ilsar | | H04W 48/16 |
| | | | | 370/244 |
| 2015/0128205 A1* | 5/2015 | Mahaffey | | H04L 63/20 |
| | | | | 726/1 |
| 2015/0188949 A1* | 7/2015 | Mahaffey | | H04L 63/20 |
| | | | | 726/1 |
| 2016/0003623 A1* | 1/2016 | Venkatraman | | H04W 76/10 |
| | | | | 701/410 |
| 2016/0178379 A1* | 6/2016 | Moraru | | G01C 21/206 |
| | | | | 701/522 |
| 2016/0343032 A1* | 11/2016 | DeWitt | | G06Q 30/0261 |

(Continued)

OTHER PUBLICATIONS

Apple, Inc.; Find my iPhone; https://itunes.apple.com/us/app/find-my-iphone/id376101648 Last accessed Jun. 6, 2017.

(Continued)

*Primary Examiner* — Tyler J Lee
(74) *Attorney, Agent, or Firm* — FisherBroyles, LLP

(57) ABSTRACT

The disclosed computer-implemented method for guiding users to network-enabled devices may include (i) monitoring network communications within a wireless network, (ii) determining, based on monitoring network communications transmitted over the wireless network that involve a network-enabled device connected to the wireless network, that an end user requires guidance to a physical location of the network-enabled device, (iii) deriving the physical location of the network-enabled device in three-dimensional space, and (iv) guiding, by a user interface, the end user to the physical location of the network-enabled device in three-dimensional space. Various other methods, systems, and computer-readable media are also disclosed.

20 Claims, 7 Drawing Sheets

(56) References Cited

U.S. PATENT DOCUMENTS

| | | | |
|---|---|---|---|
| 2017/0074965 A1* | 3/2017 | Lee | G01S 5/0252 |
| 2017/0150371 A1* | 5/2017 | Cichonski | H04B 17/318 |
| 2017/0238129 A1* | 8/2017 | Maier | H04W 4/02 |
| | | | 455/404.2 |
| 2017/0251518 A1* | 8/2017 | Agiwal | H04W 24/08 |
| 2017/0308248 A1* | 10/2017 | Choi | G06F 3/0482 |
| 2017/0318462 A1* | 11/2017 | Murdoch | H04L 63/083 |
| 2017/0347283 A1* | 11/2017 | Kodaypak | H04W 4/70 |
| 2018/0053239 A1* | 2/2018 | Li | G06Q 30/0633 |
| 2018/0054794 A1* | 2/2018 | Cariou | H04W 64/00 |
| 2018/0082059 A1* | 3/2018 | Bender | G06F 21/554 |
| 2018/0083848 A1* | 3/2018 | Siddiqi | H04L 43/045 |
| 2018/0084384 A1* | 3/2018 | Venkatraman | H04W 76/16 |
| 2018/0212791 A1* | 7/2018 | Garg | H04L 12/282 |

OTHER PUBLICATIONS

Lee, Joel; Find my iPhone for Android? Meet Android Devices Manager; http://www.makeuseof.com/tag/find-iphone-android-meet-android-device-manager/; Sep. 7, 2015.

\* cited by examiner

SYSTEMS AND METHODS FOR GUIDING USERS TO NETWORK-ENABLED DEVICES

BACKGROUND

Internet-enabled appliances and devices are becoming increasingly prevalent. For example, dishwashers, refrigerators, light bulbs, stoves, baby monitors, and even juice squeezers may incorporate network functionality to enable users to interact with their appliances and devices from nearly anywhere. These appliances and devices are frequently controlled through mobile applications that control the device, and rely on wireless network connectivity to receive instructions from end users. Such devices and appliances may be colloquially referred to as "Internet of Things" or "IoT" devices. Manufacturers of such devices frequently fail to secure devices that they produce. For example, an internet-enabled baby monitor may have a master password hard-coded into its software. One example of the dangers posed by improperly secured and/or protected internet-enabled devices can be found in the 2016 cyberattack that compromised a large number of IoT devices as part of a distributed denial of service attack against the DYN Domain Name System (DNS).

While such devices may present vulnerabilities, increasingly savvy end users may be able to take steps to preemptively address problems posed by malfunctioning, compromised, and/or vulnerable devices (e.g., by removing or replacing the device) if they are able to locate the physical device. Unfortunately, a new homeowner may be unaware of what devices are in their home, much less of the locations of such devices. The instant disclosure, therefore, identifies and addresses a need for systems and methods that guide users to network-enabled devices.

SUMMARY

As will be described in greater detail below, the instant disclosure describes various systems and methods for guiding users to network-enabled devices. In one example, a computer-implemented method for guiding users to network-enabled devices may include (i) monitoring network communications within a wireless network, (ii) determining, based on monitoring network communications transmitted over the wireless network that involve a network-enabled device connected to the wireless network, that an end user requires guidance to a physical location of the network-enabled device, (iii) deriving the physical location of the network-enabled device in three-dimensional space, and (iv) guiding, by a user interface, the end user to the physical location of the network-enabled device in three-dimensional space.

In some embodiments, the user interface may be presented to the end user through a mobile computing device. Additionally, the user interface may include a graphical user interface. Furthermore, the user interface may optionally include (i) an auditory user interface component, (ii) a range indicator that describes the distance between the end user and the physical location of the network-enabled device, (iii) a compass element that points towards the physical location of the network-enabled device, and/or (iv) an augmented-reality display that highlights the physical location of the network-enabled device.

In some examples, determining that the end user requires guidance to the physical location of the network-enabled device may include determining that the network-enabled device participated in an abnormal network communication. In one embodiment, the abnormal network communication may include (i) an unencrypted network communication, (ii) a vulnerable encryption scheme, (iii) an unrecognized encryption scheme, (iv) an expired security certificate, (v) a self-signed security certificate, (vi) a connection to a known malicious computing device, and/or (vii) a connection to an unexpected computing device.

In some examples, the computer-implemented method may further include recording the physical location of the network-enabled device. In these examples, guiding the end user to the physical location of the network-enabled device may include guiding the end user to the recorded physical location of the network-enabled device.

In further examples, guiding the end user to the physical location of the network-enabled device may include tracking the physical location of the mobile computing device while the user interface is being presented to the end user.

The described method may update position information as the user searches for the network-enabled device. For example, the computer-implemented method may include refining the physical location of the network-enabled device in three-dimensional space as the user approaches the physical location of the network-enabled device.

The above-describe method may include manipulating network connections involving the network-enabled device. For example, the computer-implemented method may include artificially extending the duration of the network communication and deriving the physical location of the network-enabled device during the artificially extended duration of the network communication.

The computer-implemented method may also enhance the user's ability to locate the network-enabled device by causing the network-enabled device to exhibit at least one behavior that alerts the end user to the physical location of the network-enabled device. For example, the behavior exhibited by the network-enabled device may include (i) power cycling the network-enabled device, (ii) emitting a noise from a speaker of the network-enabled device, (iii) blinking a light of the network-enabled device, (iv) displaying text on a display of the network-enabled device, and/or (v) displaying an image on a display of the network-enabled device.

In one embodiment, a system for implementing the above-described method may include (i) a monitoring module, stored in memory, that monitors network communications within a wireless network, (ii) a determination module, stored in memory, that determines, based on monitoring network communications transmitted over the wireless network that involve a network-enabled device connected to the wireless network, that an end user requires guidance to a physical location of the network-enabled device, (iii) a deriving module, stored in memory, that derives the physical location of the network-enabled device in three-dimensional space, (iv) a guiding module, stored in memory, that guides, by a user interface, the end user to the physical location of the network-enabled device in three-dimensional space, and (v) at least one physical processor configured to execute the monitoring module, the determination module, the deriving module, and the guiding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor network communications within a wireless network, (ii) determine, based on monitoring network communications transmitted over the wireless network that involve a network-enabled device connected to the wireless network, that an end user requires guidance to a physical location of the network-enabled device, (iii) derive the physical location of the network-enabled device in three-dimensional space, and (iv) guide, by a user interface, the end user to the physical location of the network-enabled device in three-dimensional space.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
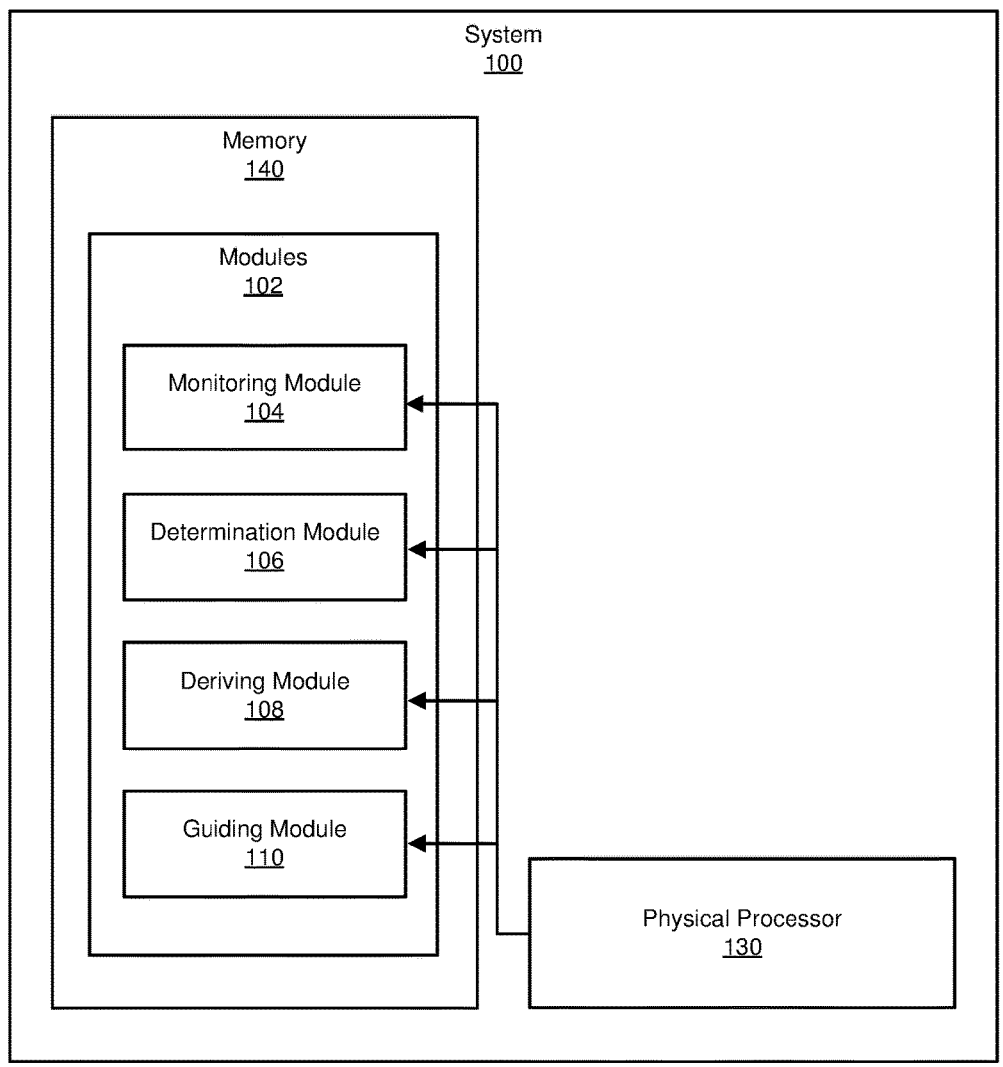
FIG. 1 is a block diagram of an example system for guiding users to network-enabled devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for guiding users to network-enabled devices. As will be explained in greater detail below, a monitoring device, such as a secure router or a smart phone with a specialized application installed, may monitor network communications within a network and determine that a device on the network is behaving in an abnormal fashion. Such abnormal behavior may include transmission of abnormal signals and/or failure to transmit expected signals. The monitoring device may then, either alone or in coordination with other devices, determine the physical location of the device exhibiting the abnormal behavior and guide a user to the device's physical location. In some embodiments, the monitoring device may be able to guide the user to a specific device in an array of alike devices, such as an array of lightbulbs. By monitoring network activity and guiding users to specific devices in this way, the systems and methods described herein may enable users to track down and address specific devices that require user intervention, even if the user is initially unaware of where those devices are located. In addition, monitoring network communications and using network activity to derive the location of a specific network-enabled device may allow a user to locate and diagnose a network-enabled device, even if the device does not cooperate with the systems and methods described herein. For example, by utilizing the systems and methods described herein, a user may be able to determine and receive guidance to the physical location of a malfunctioning IoT device without needing to access or interact with software installed on the IoT device.

Furthermore, the systems and methods described herein may improve the field of network security by enabling individuals to track down and identify IoT devices within their homes, particularly if such IoT devices represent a possible route by which to compromise the user's home network. Moreover, the systems and methods described herein may enhance the ability of homeowners to locate, identify, and manage network-enabled devices within their homes.

Figure 2:
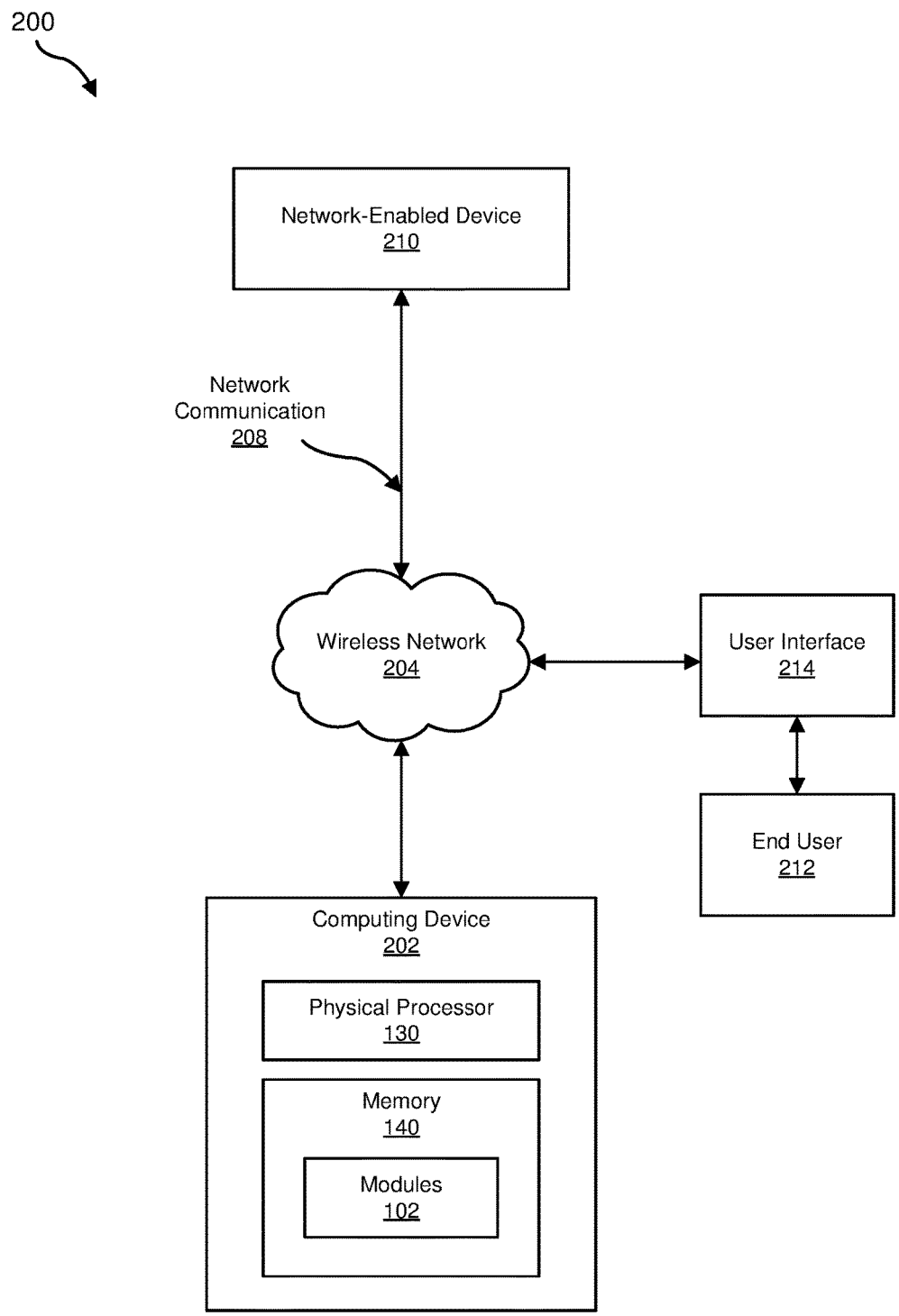
FIG. 2 is a block diagram of an additional example system for guiding users to network-enabled devices.
Figure 3:
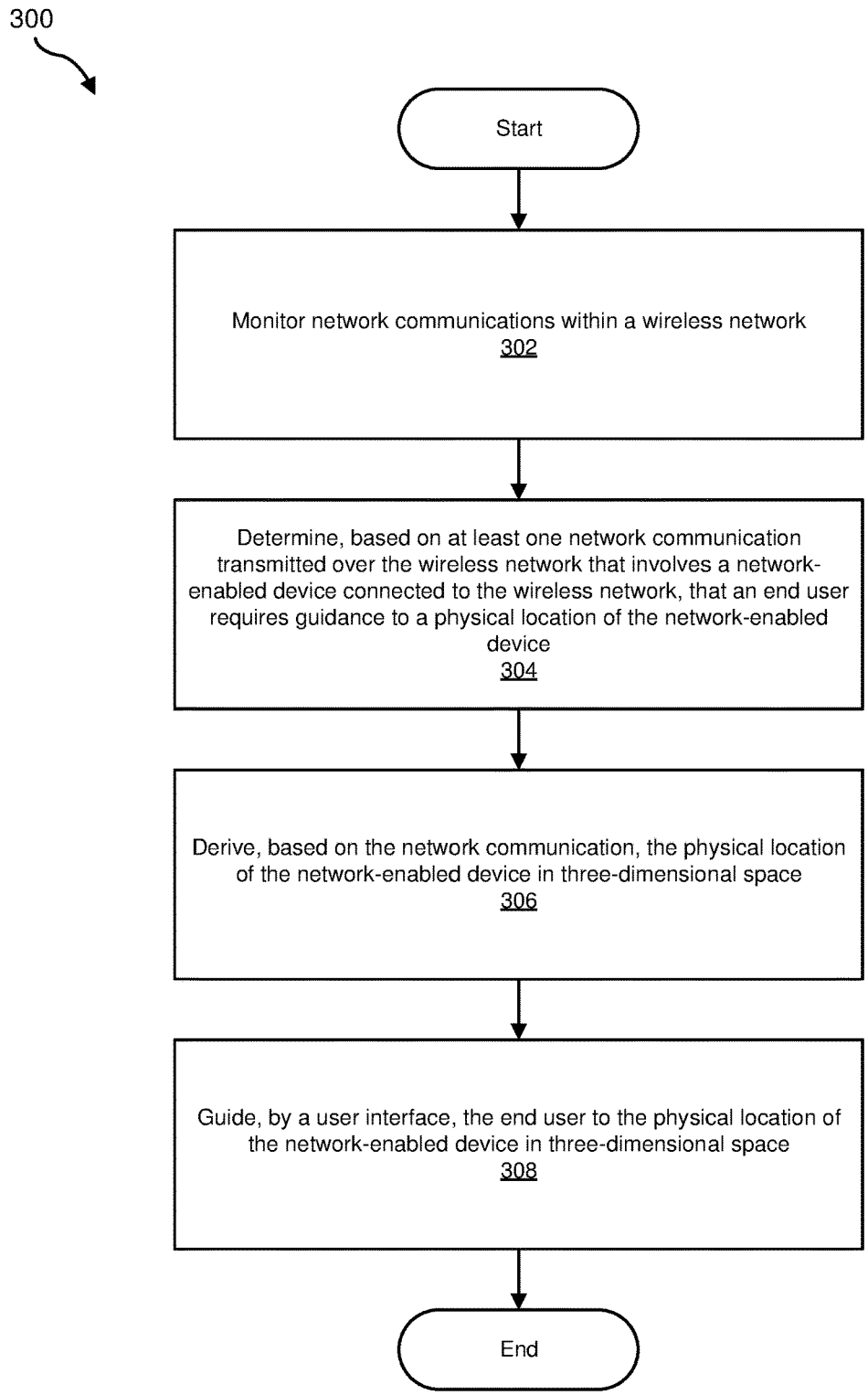
FIG. 3 is a flow diagram of an example method for guiding users to network-enabled devices.
Figure 4:
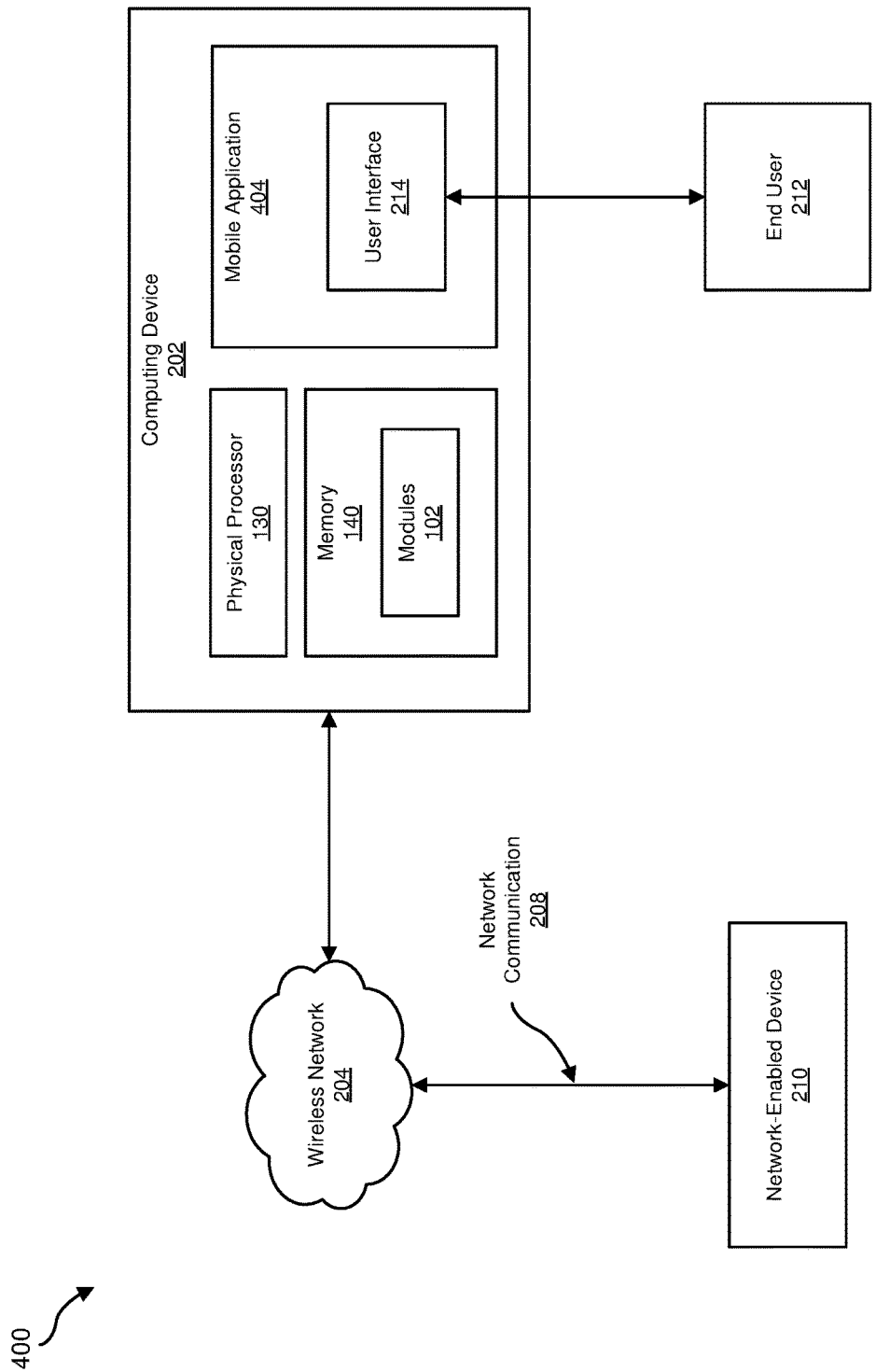
FIG. 4 is a block diagram of an example computing system for guiding users to network-enabled devices, executing on a single computing device.

The following will provide, with reference to FIGS. 1-2 and 4, detailed descriptions of example systems for guiding users to network-enabled devices. Detailed descriptions of corresponding computer-implemented methods will also be provided in connection with FIG. 3, and detailed descriptions of an example user interface for guiding an end user to a network-enabled device will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for guiding users to network-enabled devices. As illustrated in this figure, example system 100 may include one or more modules 102 for performing one or more tasks. For example, and as will be explained in greater detail below, example system 100 may include a monitoring module 104 that monitors network communications within a wireless network. Example system 100 may additionally include a determination module 106 that determines, based on monitoring network communications transmitted over the wireless network that involve a network-enabled device connected to the wireless network, that an end user requires guidance to a physical location of the network-enabled device. Example system 100 may also include a deriving module 108 that derives the physical location of the network-enabled device in three-dimensional space. Example system 100 may additionally include a guiding module 110 that guides, by a user interface, the end user to the physical location of the network-enabled device in three-dimensional space. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate guiding users to network-enabled devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a network-enabled device 210 via a wireless network 204. All or a portion of the functionality of modules 102 may be performed by computing device 202 and/or any other suitable computing system. As will be described in greater detail below, one or more of modules 102 from FIG. 1 may, when executed by at least one processor of computing device 202 and/or any other suitable computing device, enable that computing device to provide an end user 212 with information that will enable them to locate network-enabled device 210. For example, and as will be described in greater detail below, monitoring module 104 may monitor network communications within a wireless network 204. Determination module 106 may determine, based on monitoring network communications (e.g., network communication 208) transmitted over wireless network 204 that involve a network-enabled device 210 connected to wireless network 204, that end user 212 requires guidance to a physical location of network-enabled device 210. Deriving module 108 may derive the physical location of network-enabled device 210 in three-dimensional space. Guiding module 110 may guide, by a user interface 214, end user 212 to the physical location of network-enabled device 210 in three-dimensional space.

Computing device 202 generally represents any type or form of computing device capable of reading computer-executable instructions. In some embodiments, computing device 202 may represent network hardware, such as a router or command-and-control device, that is capable of analyzing network transmissions and providing device location information to end users. Additionally or alternatively, computing device 202 may represent a handheld device, such as a tablet or smart phone, that is capable of displaying a user interface to an end user. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Wireless network 204 generally represents any medium or architecture capable of facilitating communication or data transfer in a manner that does not require a physical connection between devices. In one example, wireless network 204 may facilitate communication between computing device 202 and network-enabled device 210. As an additional example, wireless network 204 may facilitate communication between network-enabled device 210 and the Internet. Communications and/or data transfers involving network-enabled device 210 are illustrated as network communication 208 in FIG. 2. Wireless network 204 may be facilitated by a variety of devices, including but not limited to routers, hotspots, access points, repeaters, and the like. Examples of wireless network 204 include, without limitation, wireless personal area networks (WPANs), BLUETOOTH, wireless local area networks (WLANs), wireless ad hoc networks, variations or combinations of one or more of the same, and/or any other mode of communicating digital information that utilizes a wireless data connection.

Network-enabled device 210 generally represents any type or form of device that is able to connect to a wireless network, such as wireless network 204. In some examples, network-enabled device 210 may be a so-called "Internet of Things" (IoT) device, such as a smart refrigerator, smart thermostat, smart lightbulb, or any other device or appliance equipped with hardware and/or software that enables an end user to remotely control the device or appliance over a network. Such remote control may be facilitated through the use of a smart phone application installed on computing device 202 that interacts with software installed on network-enabled device 210. In some embodiments, network-enabled device 210 may use wireless network 204 to communicate with a command-and-control device, such as a smart devices hub. Furthermore, an end-user may not initially be aware of the presence or location of network-enabled device. For example, a new homeowner may purchase a home with a network-enabled washing machine, but initially be unaware that the washing machine is network-enabled. As an additional example, an end user's bathroom may be equipped with an array of smart lightbulbs. The user may wish to identify a specific lightbulb that exhibited anomalous network behavior, but be unable to distinguish the malfunctioning bulb from its neighbors without assistance. As a third example, a user may initially be unaware of whether any IoT devices are located within their home. As a further example, small IoT devices such as temperature sensors, cameras, etc. may be attached to or embedded within the building infrastructure of, for example, an office building or other industrial space. A new owner of such a building may not be aware that such devices even exist, much less potentially cause problems.

End user 212 represents any individual or individuals who may require guidance to the physical location of network-enabled device 210. For example, end user 212 may be a homeowner who wants to address an improperly secured IoT device in their home. As an additional example, end user 212 may be an apartment complex maintenance staff member who needs to replace a malfunctioning smart lightbulb in an apartment hallway. In some examples, end user 212 may interact with modules 102 and/or network-enabled device 210 over wireless network 204 through a facilitating device (not illustrated in FIG. 2), such as a smart phone, tablet device, laptop computer, a purpose-built device, or any other suitable computing device that allows end user 212 to control and/or interact with network-enabled device 210 and/or computing device 202. In other examples, end user 212 may directly interact with computing device 202 (e.g., when modules 102 are executed by a smart phone, tablet device, etc.).

Furthermore, end user 212 may interact with modules 102 and/or network-enabled device 210 through user interface 214. User interface 214 generally represents any mode, method, type, or form of enabling end user 212 to communicate with electronic devices such as computing device 202 and network-enabled device 210. In some examples, user interface 214 may include an audio component, such as "pings," spoken directions, and the like. Additionally or alternatively, user interface 214 may include a visual component, such as a graphical user interface. This graphical user interface may include features that indicate a direction and/or range to network-enabled device 210. User interface 214 may also include displayed buttons, accept audio input (e.g., spoken commands), or any other suitable way of enabling end user 212 to interact with computing device 202 and/or network-enabled device 210. Various elements of user interface 214 will also be described below in conjunction with guiding module 110.

FIG. 3 is a flow diagram of an example computer-implemented method 300 for guiding users to network-enabled devices. The steps shown in FIG. 3 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor network communications within a wireless network. For example, monitoring module 104 may, as part of computing device 202 in FIG. 2, monitor network communications within wireless network 204.

Monitoring module 104 may monitor network communications within wireless network 204 in a variety of contexts. In some examples, monitoring module 104 may execute as part of a wireless access point that facilitates wireless network 204. From this vantage point, monitoring module 104 may monitor and analyze network traffic as it passes through the wireless access point. Additionally or alternatively, monitoring module 104 may execute as part of a purpose-built device, such as a home network security device and/or an IoT command-and-control (C&C) device, that connects to wireless network 204. From such a device, monitoring module 104 may be able to examine network traffic being transmitted over wireless network 204 by virtue of a user (e.g., end user 212) having provided the device with a network password to wireless network 204. In embodiments where monitoring module 104 operates as part of an IoT C&C device, the C&C device may also explicitly communicate with various network-enabled devices connected to wireless network 204, such as by querying the device's status. Monitoring module 104 may monitor communications involving certain network-enabled devices (e.g., IoT devices), but refrain from monitoring other network communications (e.g., those involving the user's personal computer) in order to ensure user privacy, minimize resource usage, and maximize the ability of the systems and methods described herein to identify, locate, and guide end-users to specific network-enabled devices.

In further embodiments, monitoring module 104 may execute as part of a mobile device application. In these examples, a mobile device equipped with the mobile device application may connect to wireless network 204 and examine network traffic being passed over wireless network 204. Additionally or alternatively, such a mobile device application may communicate with instances of monitoring module 104 that execute in other contexts, such as on a wireless access point, an IoT C&C device, etc. as described above.

While these various embodiments of monitoring module 104 are described individually, multiple instances and/or components of monitoring module 104 may cooperate across multiple devices to monitor wireless network 204. For example, multiple wireless access points may each host their own instance of monitoring module 104, and these various instances of monitoring module 104 may cooperate to ensure that all appropriate communications over wireless network 204 are examined. As an additional example, an instance of monitoring module 104 executing on a wireless access point may cooperate with a component of monitoring module 104 executing as part of a mobile device application, such as by alerting the component of monitoring module 104 that is executing on the mobile device that an anomalous network communication has been detected, triggering actions from other elements of modules 102 installed on the mobile device. As may be appreciated from these examples, monitoring module 104 may operate and coordinate across any device or combination of devices that are connected to and/or are able to access wireless network 204.

In some embodiments, monitoring module 104 may provide unprompted information to end user 212. For example, monitoring module 104 executing as part of a mobile device application may cause the mobile device to express an alert or notification (e.g., a "push notification," an alert sound, a text alert displayed on a screen of the mobile device, etc.) in response to detecting an abnormal network communication. The user may then immediately respond to the alert immediately or at a later point in time. The user's response to the alert may determine when and/or whether the systems and methods described herein begin guiding the user to the physical location of network-enabled device 210. For example, the systems and methods described herein may refrain from guiding the user to the physical location of network-enabled device 210 until end user 212 acknowledges the alert and indicates that they are ready to receive guidance to the physical location of network-enabled device 210.

An example embodiment in which monitoring module 104 executes on a mobile device is illustrated in FIG. 4. In the example of FIG. 4, computing device 202 represents a mobile device, such as a tablet or smart phone, that is capable of executing modules 102 and presenting information to end user 212 through user interface 214. User interface 214 may be part of a software application installed on computing device, such as mobile application 404.

Mobile application 404 generally represents any type or form of software designed for installation and execution on a mobile device. Mobile application 404 may represent any single file, collection of files, or software package. Mobile application 404 may be executed by physical processor 130 and/or loaded into memory 140.

Returning to FIG. 4, end user 212 may configure computing device 202 to connect to wireless network 204, e.g., by providing computing device 202 with an SSID and network password corresponding to wireless network 204. At this point, monitoring module 104 may, as part of modules 102 in FIG. 4, be able to observe and analyze network traffic being passed over wireless network 204.

At step 304 in FIG. 3, one or more of the systems described herein may determine, based on monitoring network communications transmitted over the wireless network that involve a network-enabled device connected to the wireless network, that an end user requires guidance to a physical location of the network-enabled device. For example, determination module 106 may, as part of computing device 202 in FIG. 2, determine, based on network communication 208 transmitted over the wireless network 204 that involves network-enabled device 210 connected to wireless network 204, that end user 212 requires guidance to the physical location of network-enabled device 210.

Determination module 106 may determine that end user 212 requires guidance to the physical location of network-enabled device 210 based on a variety of information. In some embodiments, determination module 106 may determine that network-enabled device 210 transmitted an error signal indicating a malfunction or other abnormal behavior in network-enabled device 210. As a specific example, a smart refrigerator or deli case in a grocery store may transmit a network communication to an IoT C&C device indicating a compressor fault. Similarly, a smart lightbulb may transmit a network communication indicating that it has burnt out and needs to be replaced. In these examples, network-enabled device 210 may be cooperating with the systems and methods described herein, and may accordingly provide additional information, such as its physical location, to determination module 106.

Conversely, determination module 106 may determine that end user 212 requires guidance to the physical location of network-enabled device 210 based on the absence of an expected network communication. For example, network-enabled device 210 may be scheduled to regularly "check in" with an IoT C&C device. A missed "check in" signal may indicate that network-enabled device 210 has malfunctioned, been compromised by an attacker, or is otherwise exhibiting abnormal behavior, thus indicating that end user 212 requires guidance to network-enabled device 210. As a specific example, a smart thermostat may routinely report the detected ambient temperature to an IoT C&C device to ensure that the temperature information can be delivered to a monitoring application on a smart phone. If the smart thermostat fails to provide an update in a timely fashion, determination module 106 may determine that the thermostat is exhibiting abnormal behavior and that end user 212 requires guidance to the smart thermostat.

Additionally or alternatively, end user 212 may manually indicate that they wish to receive guidance to network-enabled device 210. For example, end user 212 may, through user interface 214, notify determination module 106 that they would like to be guided to the physical location of network-enabled device 210. As a specific example, user interface 214 may include an option to display a list of detected and/or previously identified network-enabled devices, including network-enabled device 210. User 212 may select a "guide me to this device" option associated with a particular network-enabled device, prompting one or more of modules 102 to (a) identify the selected device as network-enabled device 210, (b) derive the physical location of the selected device, and (c) guide end user 212 to the physical location of the selected device.

In some embodiments, network-enabled device may not cooperate with the systems and methods described herein. In an example embodiment, determination module 106 may evaluate network connections being passed over wireless network 204 and detect an abnormal network communication transmitted by a non-cooperating network-enabled device. Determination module 106 may then identify at least one device connected to wireless network 204 that participated in the abnormal network connection as network-enabled device 210 in addition to determining that end user 212 requires guidance to that device. For example, network-enabled device 210 may be a network-enabled baby monitor that has been compromised by a malicious user, causing the baby monitor to transmit fraudulent connection requests to other devices as part of a distributed denial-of-service (DDoS) attack. In this example, determination module 106 may detect the fraudulent connection requests being transmitted over wireless network 204, and accordingly identify the malicious baby monitor as network-enabled device 210.

Although the above-described example uses DDoS traffic as an example of an abnormal network traffic pattern, determination module 106 may detect a variety of abnormal network communications. For example, the abnormal network communication may include an unencrypted network communication, a known-vulnerable encryption scheme, an unrecognized encryption scheme, an expired security certificate, a self-signed security certificate, a connection to a known malicious computing device, a connection to an unexpected computing device, and/or combinations of one or more of the same. In general, these abnormal network communications represent behavior on the part of network-enabled device 210 that may represent network vulnerabilities and/or evidence that network-enabled device has been compromised by an attacker.

At step 306 in FIG. 3, one or more of the systems described herein may derive the physical location of the network-enabled device in three-dimensional space. For example, deriving module 108 may, as part of computing device 202 in FIG. 2, derive the physical location of network-enabled device 210 in three-dimensional space.

The location of network-enabled device 210 in three-dimensional space may be described in a variety of ways. For example, deriving module 108 may describe the physical location of network-enabled device 210 using absolute coordinates, such as geolocation coordinates plus an elevation. As a specific example, deriving module 108 may describe the location of network-enabled device 210 using Global Positioning System (GPS) coordinates in conjunction with an elevation. However, GPS geolocation may only remain accurate to a resolution of several meters, which may be insufficiently accurate to locate, for example, a particular smart lightbulb in an array of lightbulbs. Accordingly, deriving module 108 may additionally or alternatively derive relative coordinates for network-enabled device 210. For example, deriving module 108 may derive an angle, azimuth, and distance coordinate relative to a fixed point, such as a particular wireless access point or router. As an additional example, deriving module 108 may derive position information describing the position of network-enabled device 210 relative to a handheld device that end user 212 uses to receive guidance to network-enabled device 210, as will be described in greater detail below. In this example, deriving module 108 may update the relative position information as end user 212 moves through space.

Deriving module 108 may derive the three-dimensional position of network-enabled device 210 in a variety of ways. In some embodiments, various systems may already be aware of the physical location of network-enabled device 210. For example, the physical location of network-enabled device 210 may be registered in a database, such as a device registry maintained by an IoT C&C device. In these embodiments, deriving module 108 may retrieve information describing the location of network-enabled device 210 from the database and provide this location information to other elements of modules 102. In further embodiments, network-enabled device 210 may self-report location information to deriving module 108 either directly or through other systems, such as IoT C&C software that then records the information in a database accessible to deriving module 108.

Additionally or alternatively, deriving module 108 may derive the three-dimensional position of network-enabled device 210 even when the position of network-enabled device 210 is initially unknown. Deriving module 108 may use a variety of traditional methods based on analyzing communications involving network-enabled device 210. For example, deriving module 108 may use signal triangulation, detection and evaluation of signal strength, or any other suitable method of evaluating wireless signals from a device to determine the physical location of that device.

As a specific example, deriving module 108 may execute on a mobile device and, at the mobile device, monitor the signal strength of network communications transmitted by network-enabled device 210. The signal strength of these communications may increase as end user 212 approaches the physical location of network-enabled device 210 and decrease should end user 212 move away from the physical location of network-enabled device 210. This information may be reported to end user 212 through a user interface, as will be described in greater detail below.

As an additional example, instances and/or components of deriving module 108 may cooperate across several devices to derive the physical location of network-enabled device 210. For example, a mobile device and wireless access point may each be equipped with instances and/or components of deriving module 108. These devices may cooperate to determine the physical location of network-enabled device 210 utilizing signal triangulation mechanisms.

Although the preceding examples for deriving the physical location of network-enabled device 210 are described separately, deriving module 108 may simultaneously leverage multiple ways of determining the physical location of network-enabled device 210. For example, deriving module 108 may simultaneously use the above-described signal triangulation between a mobile device, home router, and network-enabled device 210 in conjunction with a rough estimate of the physical location of network-enabled device 210 as previously recorded in a database. By combining device location methods in this way, deriving module 108 may thereby derive an accurate physical location for network-enabled device 210 with greater speed and precision than would be possible by only using a single device location method.

In some examples, deriving module 108 may record the physical location of the network-enabled device to ensure that other elements of modules 102 are able to continue guiding end user 212 to network-enabled device 210 even in the event that network-enabled device 210 stops transmitting network communications or other signals that may be used to derive the physical location of network-enabled device 210. These features will be described in greater detail below in conjunction with detailed descriptions of guiding module 110.

In some embodiments, deriving module 108 may artificially extend the duration of the network communication and derive the physical location of network-enabled device 210 during the artificially extended duration of the network communication. Some network communications may ordinarily not last long enough for deriving module 108 to derive the physical location of the origin of the network communication (i.e., the physical location of network-enabled device 210). Deriving module 108 may compensate for this by artificially prolonging the network communication to ensure that deriving module 108 is able to derive a sufficiently precise three-dimensional location for network-enabled device 210. Deriving module 108 may extend the duration of the network communication in a variety of ways, including but not limited to delaying packet processing, saturating the connection with additional packets, sending continuous Internet Control Message Protocol (ICMP) and/or Address Resolution Protocol (ARP) queries, and/or any other suitable method of prolonging the duration of a network communication.

In some embodiments, deriving module 108 may take steps to ensure that various elements of modules 102 are able to guide end user 212 to the physical location of network-enabled device 210 even in the event that network-enabled device 210 stops transmitting over wireless network 204. For example, deriving module 108 may record (e.g., in a database and/or in a memory) the physical location of network-enabled device 210. As will be described in greater detail below, other elements of modules 102 (e.g., guiding module 110) may use this recorded location information as part of guiding end user 212 to the physical location of network-enabled device 210.

Returning to FIG. 3 at step 308, one or more of the systems described herein may guide, by a user interface, the end user to the physical location of the network-enabled device in three-dimensional space. For example, guiding module 110 may, as part of computing device 202 in FIG. 2, use user interface 214 to guide end user 212 to the physical location of network-enabled device 210 in three-dimensional space.

Guiding module 110 may communicate information to end user 212 in a variety of ways. In general, guiding module 110 may utilize any suitable user interface as user interface 214, such as an audio interface and/or a graphical user interface, as part of guiding end user 212 to the physical location of network-enabled device 210 in three-dimensional space. User interface 214 may include a variety of features. For example, user interface 214 may include an auditory user interface component, a range indicator that describes the distance between end user 212 and the physical location of network-enabled device 210, a compass element that points towards the physical location of network-enabled device 210, an augmented-reality display that highlights the physical location of network-enabled device 210, combinations of one or more of the same, and/or any other suitable mode of communicating information to end user 212.

While the above-described examples of user interface 214 may be presented to end user 212 in any suitable fashion, various example embodiments may present user interface 214 to end user 212 by way of a mobile device, such as computing device 202 as illustrated and described in FIG. 4. For example, guiding module 110 may use speakers and/or a microphone incorporated into a mobile device to communicate audio directions, such as spoken words or "sonar pings" indicating a direction and/or distance to network-enabled device 210. As an additional example, guiding module 110 may leverage a camera input in conjunction with a display screen of a mobile device to provide end user 212 with an augmented-reality view of their surroundings, such as by displaying a route towards network-enabled device 210 overlaid on a view of the user's surroundings and/or highlight a portion of the display screen that overlays a display of network-enabled device 210. Guiding module 110 may also use previously established mapping information, such as a layout diagram of a user's home, to illustrate the location of network-enabled device 210. As a further example, guiding module 110 may cause user interface 214 to display a compass graphic that points in the direction of network-enabled device 210. The compass graphic may optionally include a range indicator that describes the distance between end user 212 and network-enabled device 210. These embodiments should merely be considered as examples in nature, as a mobile device may present any suitable form of user interface to end user 212 as part of guiding end user 212 to the physical location of network-enabled device 210.

Figure 5:
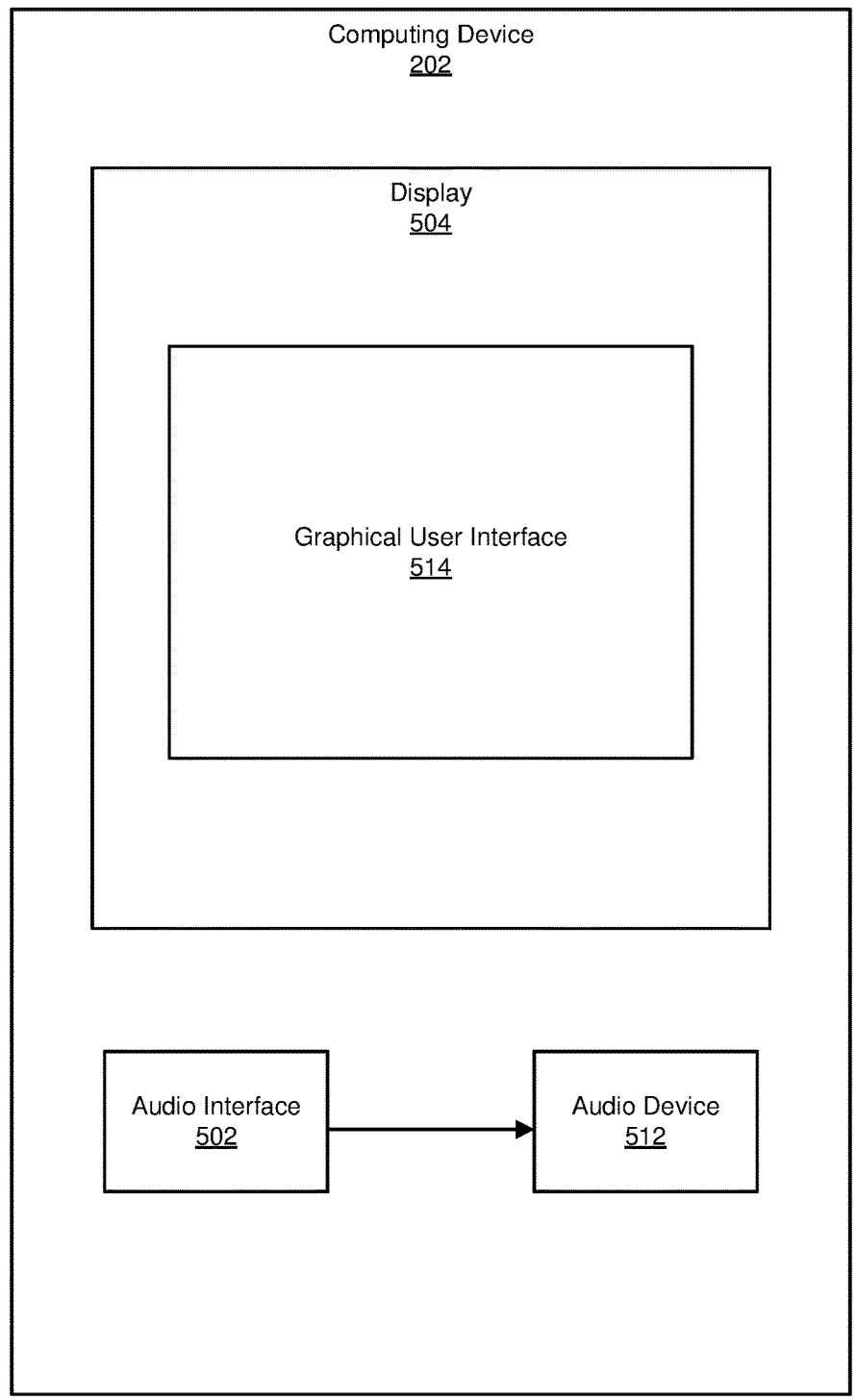
FIG. 5 is a block diagram of an example user interface presented to an end user through a mobile computing device.

An illustrated example of user interface 214 being presented through a mobile device is provided in FIG. 5. In the illustration of FIG. 5, computing device 202 represents a handheld mobile device, such as a smart phone or tablet computing device. Computing device may be equipped with a display 504 (i.e., a screen) that is able to display images, animations, text, and the like. Computing device 202 may also be equipped with an audio device 512, such as a speaker/microphone set. In this example, user interface 214 may be composed of multiple components, illustrated as graphical user interface 514 and audio interface 502. These components may be presented to end user 212 through the appropriate device. Specifically, graphical user interface 514 may be presented to end user 212 via display 504, and audio interface 502 may be presented to end user 212 via audio device 512. Graphical user interface 514 may include a variety of features, such as indicators showing direction and/or distance to network-enabled device 210, buttons that allow end user 212 to control and/or configure the various elements of user interface 214, etc. Audio interface 502 may include text-to-speech conversion, speech-to-text conversion, audio cues that indicate the direction and/or range to network-enabled device, etc.

Guiding module 110 may use a variety of information to guide end user 212 to the physical location of network-enabled device 210. As described above, deriving module 108 may derive the physical location of network-enabled device 210. Deriving module 108 may continue to update this location information as long as elements of modules 102 are able to detect transmissions involving network-enabled device 210. These updates may refine the derived location of network-enabled device 210, enabling guiding module 110 to guide end user 212 with greater accuracy. Additionally or alternatively, deriving module 108 may record location information, as described above. Guiding module 110 may access this recorded location information and guide end user 212 to the recorded location.

In examples where end user 212 receives guidance through a mobile device, guiding module 110 may guide end user 212 to the physical location of network-enabled device 210 by tracking the physical location of the mobile computing device while user interface 214 is being presented to end user 212 through the mobile computing device. Guiding module 110 may use the physical location of the mobile device to assist in guiding end user 212 to the physical location of network-enabled device 210. For example, guiding module 110 may update a graphical user interface showing the relative locations of end user 212 and network-enabled device 210. In examples where guiding module 110 communicates with end user 212 through an audio interface, guiding module 110 may use the position of the mobile device to provide audio cues indicating whether end user 212 is facing towards or away from network-enabled device 210, whether end user 212 is moving towards or away from network-enabled device 210, etc.

In some examples, various elements of modules 102 may refine the derived physical location of the network-enabled device in three-dimensional space. As described above, deriving module 108 may continue to derive location information about network-enabled device 210 so long as network-enabled device 210 communicates over wireless network 204. For example, deriving module 108 may refine the derived location of network-enabled device 210 based on multiple network communications involving network-enabled device 210, increasing the precision of the derived location as more information is collected about the detected network communications. Additionally or alternatively, deriving module 108 may conserve processing power and/or time to guide end user 212 to network-enabled device 210 by refining the derived location for network-enabled device 210 as end user 212 approaches the physical location of the network-enabled device.

In some embodiments, guiding module 110 may refine the location of network-enabled device 210 presented through user interface 214 as end user 212 approaches network-enabled device 210. For example, guiding module 110 may be aware of the precise physical location of network-enabled device 210, but initially present a broad search area to end user 212. Once end user 212 has entered that broad search area, guiding module 110 may provide additional guidance information and/or shrink the search area as end user 212 homes in on the actual location of network-enabled device 210. As a specific example, guiding module 110 may provide an apartment complex maintenance technician with a floor number, indicating which floor of the building contains network-enabled device 210. Once the maintenance technician reaches that floor, guiding module 110 may refine the presented location to an apartment number, then switch to an even more precise mode of guidance (e.g., compass, sonar, augmented reality display, etc. as described above) once the technician has reached that apartment number. By initially providing broad guidance and incrementally refining the presented location information, guiding module 110 may thereby enable users to efficiently make their way to the physical location of network-enabled device 210.

In examples where the systems and methods described herein are able to communicate with network-enabled device 210 and/or a control device that manages network-enabled device 210 (e.g., an IoT C&C device), guiding module 110 may highlight network-enabled device by causing network-enabled device 210 to exhibit at least one behavior that alerts end user 212 to the physical location of network-enabled device 210. For example, guiding module 110 may power-cycle network-enabled device 210 by, for example, sending instructions to network-enabled device 210 and/or by interrupting then restoring a supply of power to network-enabled device 210. Additional examples of behaviors that guiding module 110 may induce in network-enabled device 210 include, without limitation, causing network-enabled device 210 to emit a noise or sound from a speaker of network-enabled device, blinking a light of network-enabled device 210, causing a display of network-enabled device 210 to display an image, symbol or text message, and/or any other suitable behavior that may further distinguish network-enabled device 210 from other nearby devices and/or its surroundings.

As described above in connection with example method 300, a smart phone application may, either on its own or in cooperation with another computing device such as a NORTON CORE router, detect abnormal network communications involving a network-enabled device. The application and/or applications may use these abnormal network communications to determine the physical location of a device involved in the abnormal network communications and guide an end user to that device via a user interface displayed through the smart phone.

Figure 6:
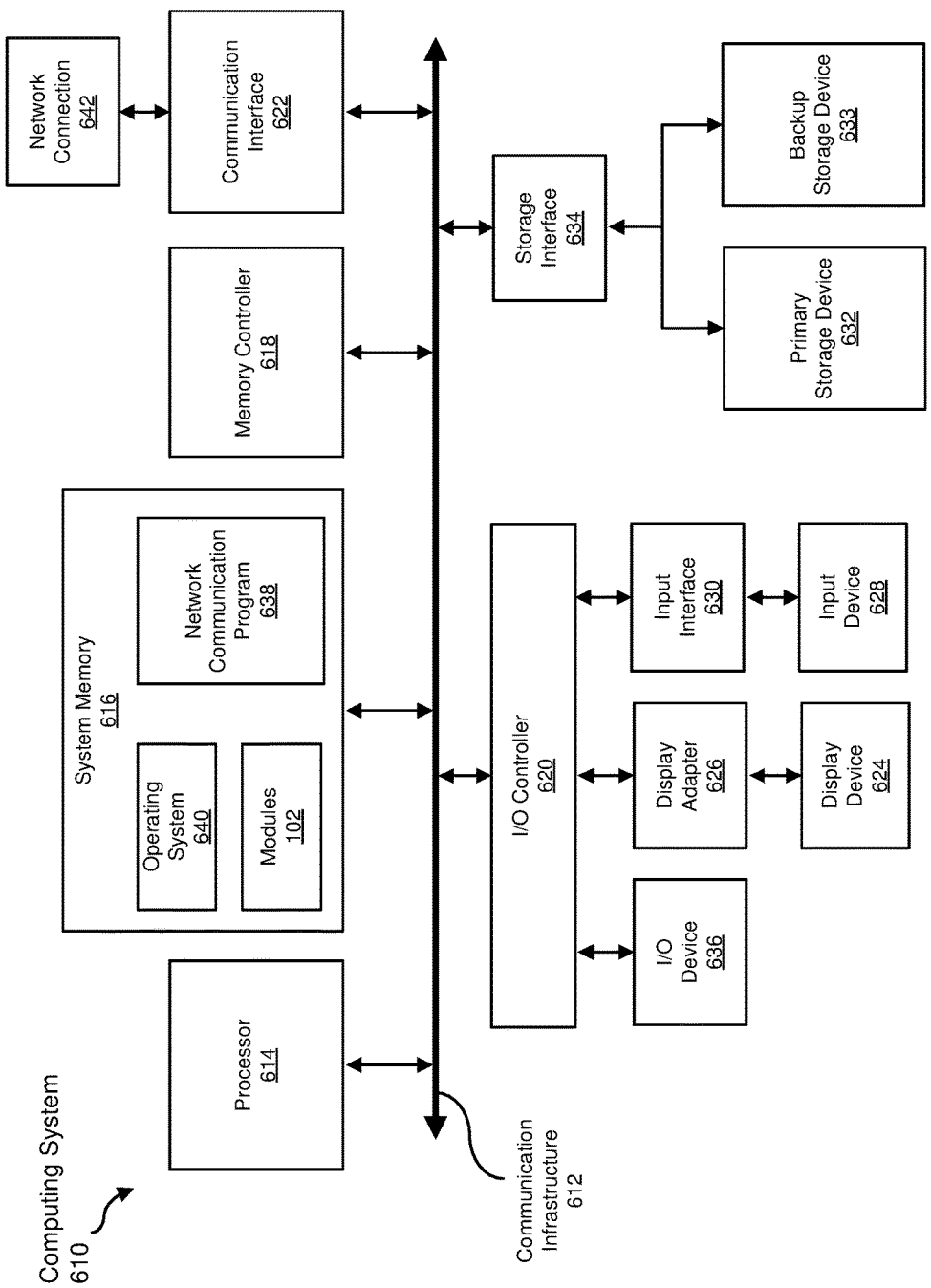
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
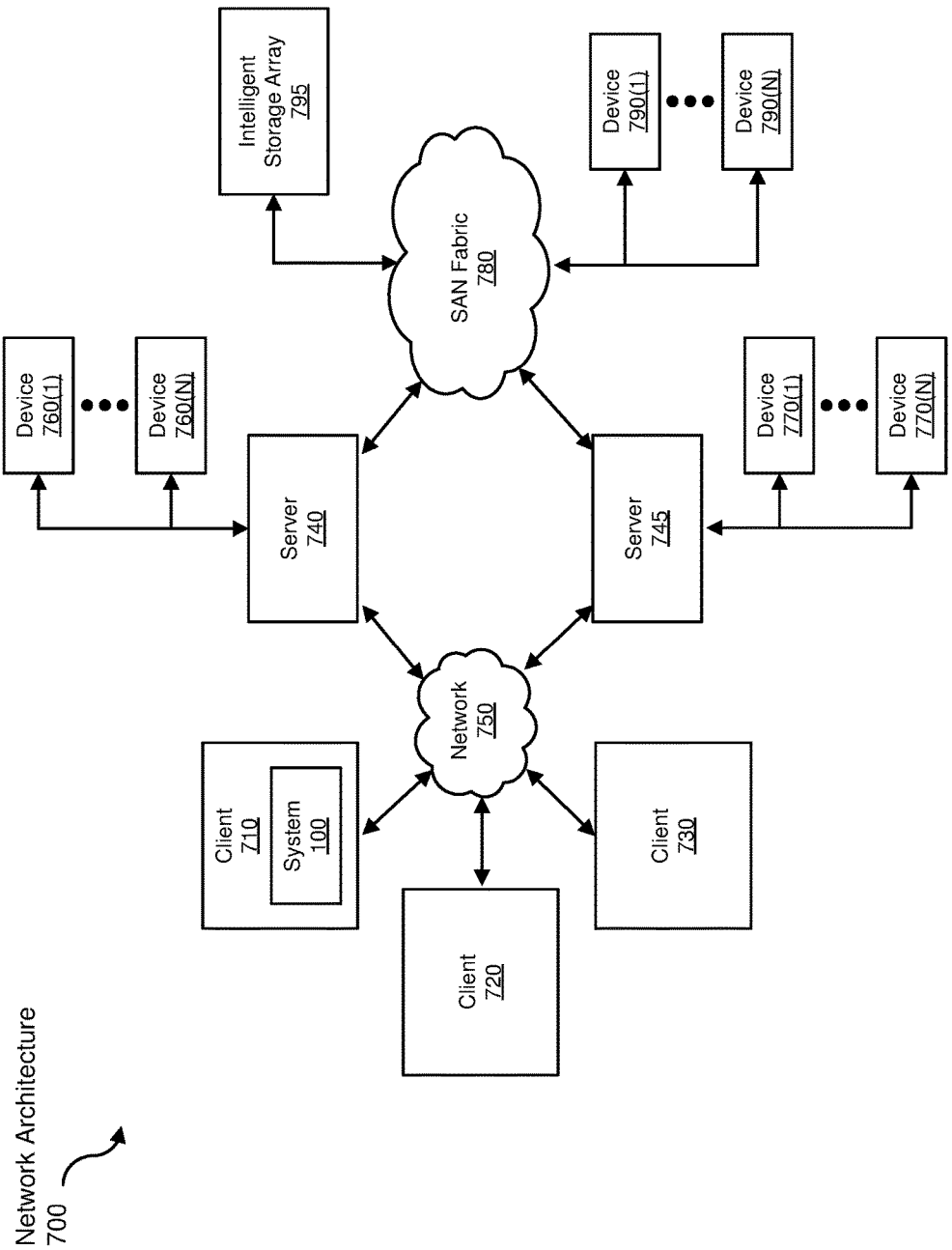
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for guiding users to network-enabled devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules described herein may receive network communications to be transformed, transform the network communications into a device identifier and/or device location of a network-enabled device, store a result of the transformation to a memory and/or database, display a result of the transformation to an end user via a user interface to guide the end user to the location of the network-enabled device, and/or update the information displayed on the user interface as the end user moves towards the network-enabled device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for guiding users to network-enabled devices, at least a portion of the method being performed by a computing device comprising at least one processor, the method comprising:
monitoring, at a command-and-control device that manages a plurality of network-enabled devices connected to a wireless network, network communications within the wireless network;
determining, based on monitoring network communications transmitted over the wireless network that involve a particular network-enabled device in the plurality of network-enabled devices, that an end user requires guidance to a physical location of the particular network-enabled device;
deriving the physical location of the particular network-enabled device in three-dimensional space; and guiding, by a user interface of an additional network-enabled device, the end user to the physical location of the particular network-enabled device in three-dimensional space.

2. The method of claim 1, wherein determining that the end user requires guidance to the physical location of the particular network-enabled device comprises determining that the particular network-enabled device participated in an abnormal network communication.

3. The method of claim 2, wherein the abnormal network communication comprises at least one of:
   an unencrypted network communication;
   a known-vulnerable encryption scheme;
   an unrecognized encryption scheme;
   an expired security certificate;
   a self-signed security certificate;
   a connection to a known malicious computing device; and
   a connection to an unexpected computing device.

4. The method of claim 1, wherein the additional network-enabled device comprises a mobile computing device.

5. The method of claim 4, wherein guiding the end user to the physical location of the particular network-enabled device comprises tracking the physical location of the mobile computing device while the user interface is being presented to the end user.

6. The method of claim 1: further comprising recording the physical location of the particular network-enabled device; and
   wherein guiding the end user to the physical location of the particular network-enabled device comprises guiding the end user to the recorded physical location of the particular network-enabled device.

7. The method of claim 1, further comprising refining the physical location of the particular network-enabled device in three-dimensional space as the user approaches the physical location of the particular network-enabled device.

8. The method of claim 1, further comprising:
   artificially extending the duration of the network communication; and
   deriving the physical location of the particular network-enabled device during the artificially extended duration of the network communication.

9. The method of claim 1, wherein the user interface comprises at least one of:
   an auditory user interface component;
   a range indicator that describes the distance between the end user and the physical location of the particular network-enabled device;
   a compass element that points towards the physical location of the particular network-enabled device; and
   an augmented-reality display that highlights the physical location of the particular network-enabled device.

10. The method of claim 1, further comprising causing the particular network-enabled device to exhibit at least one behavior that alerts the end user to the physical location of the particular network-enabled device.

11. The method of claim 10, wherein the behavior exhibited by the particular network-enabled device comprises at least one of:
   power cycling the particular network-enabled device;
   emitting a noise from a speaker of the particular network-enabled device;
   blinking a light of the particular network-enabled device;
   displaying text on a display of the particular network-enabled device; and
   displaying an image on a display of the particular network-enabled device.

12. The method of claim 1, wherein determining that the end user requires guidance to the physical location of the particular network-enabled device comprises determining that the particular network-enabled device failed to transmit an expected network communication.

13. A system for guiding users to network-enabled devices, the system comprising:
   a monitoring module, stored in a memory of the system, that monitors, at a command-and-control device that manages a plurality of network-enabled devices connected to a wireless network, network communications within the wireless network;
   a determination module, stored in the memory, that determines, based on monitoring network communications transmitted over the wireless network that involve a particular network-enabled device in the plurality of network-enabled devices, that an end user requires guidance to a physical location of the particular network-enabled device;
   a deriving module, stored in the memory, that derives the physical location of the particular network-enabled device in three-dimensional space;
   a guiding module, stored in the memory, that guides, by a user interface of an additional network-enabled device, the end user to the physical location of the particular network-enabled device in three-dimensional space; and
   at least one physical processor configured to execute the monitoring module, the determination module, the deriving module, and the guiding module.

14. The system of claim 13, wherein the determination module determines that the end user requires guidance to the physical location of the particular network-enabled device by determining that the particular network-enabled device participated in an abnormal network communication.

15. The system of claim 14, wherein the abnormal network communication comprises at least one of:
   an unencrypted network communication;
   a known-vulnerable encryption scheme;
   an unrecognized encryption scheme;
   an expired security certificate;
   a self-signed security certificate;
   a connection to a known malicious computing device; and
   a connection to an unexpected computing device.

16. The system of claim 13, wherein the additional network-enabled device comprises a mobile computing device.

17. The system of claim 16, wherein the guiding module tracks the physical location of the mobile computing device while the user interface is being presented to the end user.

18. The system of claim 13, wherein:
   the deriving module records the physical location of the particular network-enabled device; and
   the guiding module guides the end user to the recorded physical location of the particular network-enabled device.

19. The system of claim 13, wherein the deriving module refines the physical location of the particular network-enabled device in three-dimensional space as the user approaches the physical location of the particular network-enabled device.

20. A non-transitory computer-readable medium comprising one or more computer-readable instructions that, when executed by at least one processor of a computing device, cause the computing device to:

monitor, at a command-and-control device that manages a plurality of network-enabled devices connected to a wireless network, network communications within the wireless network;

determine, based on monitoring network communications transmitted over the wireless network that involve a particular network-enabled device in the plurality of network-enabled devices, that an end user requires guidance to a physical location of the particular network-enabled device;

derive the physical location of the particular network-enabled device in three-dimensional space; and guide, by a user interface of an additional network-enabled device, the end user to the physical location of the particular network-enabled device in three-dimensional space.

* * * * *